(12) United States Patent
Voss et al.

(10) Patent No.: US 7,233,354 B2
(45) Date of Patent: Jun. 19, 2007

(54) DIGITAL CAMERA THAT ADJUSTS RESOLUTION FOR LOW LIGHT CONDITIONS

(75) Inventors: James S. Voss, Clovis, CA (US); James W. Owens, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 839 days.

(21) Appl. No.: 10/269,047

(22) Filed: Oct. 11, 2002

(65) Prior Publication Data

US 2004/0070682 A1    Apr. 15, 2004

(51) Int. Cl.
*H04N 3/14* (2006.01)
*H04N 5/225* (2006.01)
*H04N 5/228* (2006.01)

(52) U.S. Cl. .................. 348/308; 348/373; 348/363

(58) Field of Classification Search ............... 348/294, 348/302, 308, 229.1, 363, 373
See application file for complete search history.

(56) References Cited

U.S. PATENT DOCUMENTS

| | | | | |
|---|---|---|---|---|
| 5,138,459 | A  * | 8/1992  | Roberts et al. | 348/231.6 |
| 5,815,205 | A  * | 9/1998  | Hashimoto et al. | 348/373 |
| 5,848,123 | A  * | 12/1998 | Strommer | 378/98.8 |
| 5,909,026 | A  * | 6/1999  | Zhou et al. | 250/208.1 |
| 5,949,483 | A  * | 9/1999  | Fossum et al. | 348/303 |
| 6,515,705 | B1 * | 2/2003  | Fumio et al. | 348/375 |
| 6,633,331 | B1 * | 10/2003 | Potter et al. | 348/207.11 |
| 6,693,670 | B1 * | 2/2004  | Stark | 348/308 |
| 6,801,258 | B1 * | 10/2004 | Pain et al. | 348/302 |
| 6,885,395 | B1 * | 4/2005  | Rabbani et al. | 348/231.1 |
| 2003/0147001 | A1 * | 8/2003 | Kikuchi et al. | 348/363 |
| 2006/0077269 | A1 * | 4/2006 | Kindt et al. | 348/294 |

* cited by examiner

*Primary Examiner*—Vivek Srivastava
*Assistant Examiner*—Justin Misleh

(57) ABSTRACT

A digital camera including a photosensor with a plurality of picture elements that define an image resolution that is adjustable.

10 Claims, 3 Drawing Sheets

DIGITAL CAMERA THAT ADJUSTS RESOLUTION FOR LOW LIGHT CONDITIONS

BACKGROUND

The process of capturing images includes forming a visible image of a subject on a photosensitive surface by introducing light or other forms of radiation thereto. Image capturing devices are widely used for videography, photography, infrared photography, ultraviolet photography, stereoscopic photography, microphotography, and thermography. Such devices generally include video cameras, film cameras, and digital cameras.

Cameras basically include a light-tight body having an image capturing medium at a back end thereof, a shutter mechanism in front of the image capturing medium, an aperture in front of the shutter, and a lens disposed oppositely of the image capturing medium at a front end of the camera. The lens focuses light from a photographic subject through the aperture and shutter and onto the image-capturing medium to form an image of the subject thereon. The shutter and aperture together control exposure of the image-capturing medium. The shutter controls the length of time the image-capturing medium is exposed to light from the subject and the aperture is adjustable in size to control the amount of light from the subject that impinges on the image-capturing medium. Other camera features typically include a viewfinder to show the photographic subject, flash units to illuminate the photographic subject, and exposure meters to measure light.

Digital cameras are increasingly popular and technology advances are rapidly resulting in increased performance capability. A digital camera captures a subject, scene, or view in elemental portions and generates an electronic signal that is representative of the subject, scene, or view. Unlike conventional film cameras that use a photoresponsive film as the image capturing medium, digital cameras typically use electronic photosensors such as one or more charge coupled device (CCD) chips. The CCD chips are configured to receive light reflecting from the photographic subject and to convert the reflected light into an electronic signal. A CCD chip includes an array of very fine picture elements or "pixels" arranged in horizontal rows and vertical columns.

Upon exposure to imaging light from a subject, the CCD chips collect an array of discrete light energies or photon charges that correspond to or map the photographic subject column-by-column, row-by-row, and pixel-by-pixel such that a photon charge representation of the subject is seized. The CCD uses off-chip electronic circuits to process the photon charges and convert them into useful digital signals that can be stored in electronic memory either on or off-camera. Thus, digital cameras provide highly convenient features such as instant picture display and electronic storage format among many others, but provide image quality that is not as capable of handling low-light conditions as that of conventional film cameras.

Image resolution in digital cameras continues to improve as CCD chips with finer pixel sizes are developed that enable finer elemental representations of a photographic subject. Unfortunately, finer pixel size tends to adversely affect the already compromised low-light performance of a digital camera. More particularly, the light sensitivity or light gathering ability of a CCD decreases with reductions in pixel size over a given surface area of the CCD. In other words, for a CCD of a given surface area, the light gathering ability of the CCD decreases with increases in pixel count. This is because the CCD tends to lose optical sensing surface area to accommodate the width of borderlines between adjacent pixels. The result is increased image resolution via finer parsing of the view, but at a cost of reduced light gathering ability and hence reduced low-light level performance.

Low-light performance in digital cameras has typically been adjusted by varying the typical mechanical exposure settings of shutter speed, and aperture size, and also by adjusting the electronic setting of CCD output gain. One problem in varying shutter speed is a blurred image caused by relative movement between the camera and photographic subject while the shutter is open for a relatively long period of time to let more light into the camera. Also, a problem in varying gain is that increases in gain result in increases in noise and corresponding decreases in image quality. Digital cameras combine gain and exposure control into an automatic image enhancement feature. Unfortunately, such features are still susceptible to blur and noise problems and do not provide a user with readily accessible independent and dynamic range control of the resolution and light gathering ability of the image capturing medium.

SUMMARY

One embodiment of the present invention may comprise a digital camera including a means for directing radiant energy into the digital camera and a means for capturing an image from the radiant energy. The means for capturing includes a plurality of elements that define an image resolution, and the embodiment further includes a means for selectively and dynamically adjusting the image resolution.

Another embodiment of the present invention may comprise a digital camera including a lens for directing radiant energy into the digital camera and an image-capturing medium upon which the radiant energy impinges. The image-capturing medium includes a plurality of pixels that define an image resolution of the digital camera. A resolution control selector is in communication with the image-capturing medium to vary the image resolution.

Yet another embodiment of the present invention may comprise a digital camera including a lens for directing light into said digital camera and a body connected to the lens, wherein the body includes a CMOS sensor having an array of pixels that define an image resolution of the digital camera. A resolution selector is provided for varying the image resolution to adjust low light performance of the digital camera. The resolution selector is attached to at least one of the lens and the body and is in communication with the CMOS sensor.

Still another embodiment of the present invention may comprise a method of imaging including: directing radiant energy into a digital camera; capturing an image from the radiant energy on a plurality of elements that define an image resolution; and selectively and dynamically adjusting the image resolution.

A further embodiment of the present invention may comprises a sensor assembly including a CMOS photosensor having a plurality of pixels arranged in a grid, and further including a light sensor that senses ambient light levels and generates a control signal in response thereto. A control system selectively groups pixels of the plurality of pixels and sums signal outputs of selectively grouped pixels of the plurality of pixels in response to the control signal.

Yet a further embodiment of the present invention may comprise a digital camera having a CMOS photosensor having a plurality of pixels arranged in a grid, and further including a light sensor that senses ambient light levels and generates a control signal in response thereto. A control system selectively groups pixels of the plurality of pixels and sums signal outputs of selectively grouped pixels of the plurality of pixels in response to the control signal.

DETAILED DESCRIPTION

Figure 1:
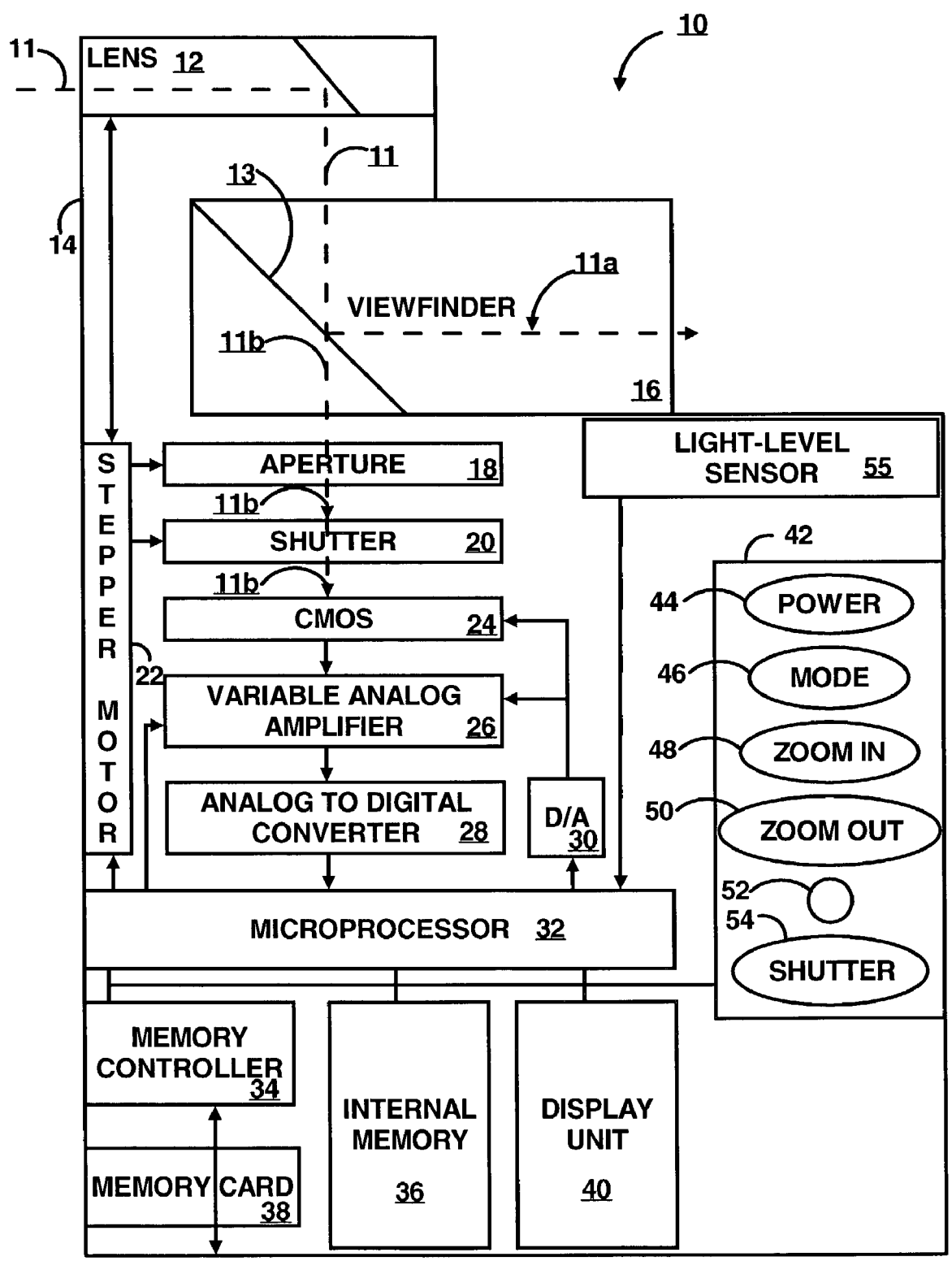
FIG. 1 is a block diagrammatic view of a digital camera according to an embodiment of the present invention.

Referring now in detail to the Figures, there is shown in FIG. 1 a block diagram of a digital camera 10 according to one embodiment of the present invention. The digital camera 10 generally includes a lens or lens assembly 12 attached to a body 14, and within the body 14 there is a viewfinder 16, an aperture 18, a shutter 20, and a stepper motor 22 for adjusting the lens assembly 12, aperture 18, and shutter 20. Also within the body 12 there is an image capturing medium 24, a gain control device 26, an analog-to-digital (A-D) converter 28, a digital-to-analog (D-A) converter 30, a microprocessor 32, a memory controller 34, an internal memory unit 36, and a memory card 38. A display 40 and control panel 42 are provided on the body 12 for input/output with the user. Power is provided by a power unit such as a battery (not shown).

The digital camera 10 is capable of operation in a variety of lighting conditions ranging from the very bright sunlit outdoors to very dimly lit or dark situations. Low-light performance of the digital camera 10 is implemented in a variety of ways, as will be discussed in greater detail below. In one embodiment, the digital camera 10 adjusts to low-light conditions by modifying one or more of the following settings: size of the aperture 18, speed of the shutter 20, gain from the image capturing medium 24, and resolution capability of the image capturing medium 24.

Starting at the front of the camera 10, the lens assembly 12 may be an integral part of the body 14 or may be separately and removably connected to the front thereof. In any case, the lens assembly 12 is used to direct radiant energy into the digital camera 10 by focusing, isolating, or framing a selected subject, scene, or view of the world from which emanates or reflects rays of energy. In other words, the lens assembly 12 provides a conduit into which rays of light, shown specifically at 11, are received and through which the rays of light travel to the inside of the digital camera 10. The stepper motor 22 couples to and adjustably drives the lens assembly 12 to magnify, zoom, or otherwise enlarge the appearance of a framed view. A light splitting device 13, such as a dichromic mirror, splits and directs the incoming light 11 into a first light path 11a that passes through the viewfinder 16 and a second light path 11b that leads to medium 24. The viewfinder 16 is typically integrated within the body 14 and is provided to optically communicate a framed view of the world to a user looking into the viewfinder 16. This view generally corresponds to an optical image projected onto the medium 24 by lens assembly 12.

The aperture 18 is located within the body 14 of the digital camera 10 along imaging light path 11b behind the lens assembly 12 and variably regulates, over a range of opening sizes, the amount of imaging light that passes through the lens assembly 12 into the body 14 of the digital camera 10. The shutter 20 is mounted in the imaging light path 11b behind the lens assembly 12 and aperture 18 and is a normally closed device that snaps open to let light pass therethrough and impinge on the image capturing medium 24. The stepper motor 22 is coupled to and adjustably drives the aperture 18 and shutter 20 independently or in combination with one another to vary the exposure of the image-capturing medium 24 to imaging light, which passes through the lens assembly 12, aperture 18, and shutter 20. Accordingly, the low-light level performance of the digital camera 10 can be regulated by increasing or decreasing the exposure of the image capturing medium 24. But, increasing the exposure of the image capturing medium 24 requires increased camera stability while the digital camera 10 captures an image of a view. Alternatively, the shutter 20 need not be a mechanical device, but rather can be an electronic function of the image-capturing device. Regardless, the function of the shutter 20 is to momentarily, over a variable range of time, permit light to expose the photoresponsive elements of the image-capturing medium 24.

The image capturing medium 24 may be a complimentary metal oxide semiconductor (CMOS) sensor that is positioned behind the lens, aperture, and shutter within the body of the camera. The image capturing medium encompasses any device or material that is capable of capturing radiant energy and at least partially capable of converting same into an electronic signal that becomes a virtual representation of the optical image projected onto the sensor 24 by the lens assembly 12.

The image-capturing medium may be a CMOS sensor 24, which is a photoresponsive device that includes very fine sub-elements, sub-sensors, or pixels that are typically arranged in rows and columns to define an array or grid. Upon exposure to light energy, or photons, reflecting from a view and passing through the lens, aperture, and shutter, each pixel of the array gets "filled" with a photoelectronic charge that represents an elemental portion of a virtual representation of the subject, scene, or view. The more pixels in an array, the better the representation, or resolution, of the view. Digital camera technology has progressed such that significant reductions in pixel size, and thus, increases in resolution capability, have been achieved. Today, CMOS sensors have a resolution of millions of pixels and, for example, a four mega-pixel (4 Mp) sensor provides an array of 2,000 rows by 2,000 columns of individual pixels. CMOS sensors are known in the art and examples of such are disclosed in the following patents which are hereby incorporated by reference herein: U.S. Pat. No. 6,215,113 to Chen et al., and U.S. Pat. No. 6,344,669 to Pan.

The gain control device 26 is connected the CMOS sensor 24 to amplify the electronic signals therefrom. The gain control device 26 may be a variable analog amplifier that is connected between the A-D converter 28 and the CMOS sensor 24 to regulate the intensity of the electronic signal passing from the CMOS sensor 24 to the microprocessor 32 via the A-D converter 28. The intensity of the signal is also regulated by the microprocessor 32 via the D-A 30 converter that is interposed the microprocessor 32 and gain control device 26. The A-D converter converts the amplified analog signals from the gain control device 26 into digital signals of acceptable levels that are appropriate for the microprocessor 32.

The low-light level performance of the digital camera 10 can also be regulated by the gain control device 26. The microprocessor 32 can signal the gain control device 26 to amplify the signal from the CMOS sensor 24 to make up for a weak signal due to low-light conditions, with some attendant amplification of inherent noise from the CMOS sensor 24. The gain control device 26, aperture 18, and shutter may be adjustable together in any combination or adjustable independently to constitute an image enhancement apparatus that is automatically controlled by the microprocessor 32.

The microprocessor 32 operates under control programs or software that are stored in the internal memory unit 36 to which the microprocessor 32 is connected. The memory controller 34 is connected to the microprocessor 32 and internal memory unit 36 for controlling the handling of images captured by the digital camera 10 and stored on the removable memory card 38 which is removably plugged into the memory controller 34. Such captured images are made available to the user for viewing on the display panel 40 which is driven by the microprocessor 32.

The user sees a representative image of the view on the display panel 40 and controls the digital camera 10 via the control panel 42 which are both communicated with the microprocessor 32 of the digital camera 10. The display panel 40 can be an LCD screen, gas plasma screen, or other display device.

The control panel 42 is attached to the body 14 of the digital camera 10 and includes a set of control selectors including buttons, switches, knobs, or the like, including a power on/off button 44, a mode selection switch 46, zoom in—zoom out buttons 48 and 50, a resolution control knob 52, and a shutter button 54. The resolution control knob 52 can also be a dial, button, switch, and the like.

The resolution control knob 52 is a user input selector device that provides the user the opportunity to selectively and dynamically adjust image resolution among multiple different resolution settings and at any time such as while framing a view, zooming a view, and/or while the digital camera 10 is focusing or adjusting. Especially in the case of low light conditions, the resolution control knob 52 is provided to independently and dynamically control the camera's image resolution and, thus, the camera's low light performance, by virtually changing the size of the pixels of the CMOS sensor 24 via the microprocessor 32 and D-A converter 30, as shown in FIG. 1 and as further described below with respect to FIGS. 2A-2C.

Alternatively, and still referring to FIG. 1, it is contemplated that the resolution control could also be carried out in an automatic mode using information from a light-level sensor 55 as input to the microprocessor 32. The light-level sensor 55 senses the ambient light conditions under which the digital camera 10 is operating, and outputs a signal for use by the microprocessor 32 in deciding how and how much to adjust low-light performance of the digital camera 10. In turn, the microprocessor 32 outputs signals directly to the stepper motor 22, and indirectly to the CMOS sensor 24 and gain control device 26 via the D-A converter 30. Again, the microprocessor 32 operates under pre-programmed instructions that are loaded to the internal memory unit 36 and communicated to the microprocessor 32. Such instructions, or software, can enable the microprocessor 32 to decide whether to adjust aperture size, shutter speed, CMOS gain, or CMOS resolution, or any combination thereof, based at least in part on input from the light-level sensor 55.

Figure 1A:
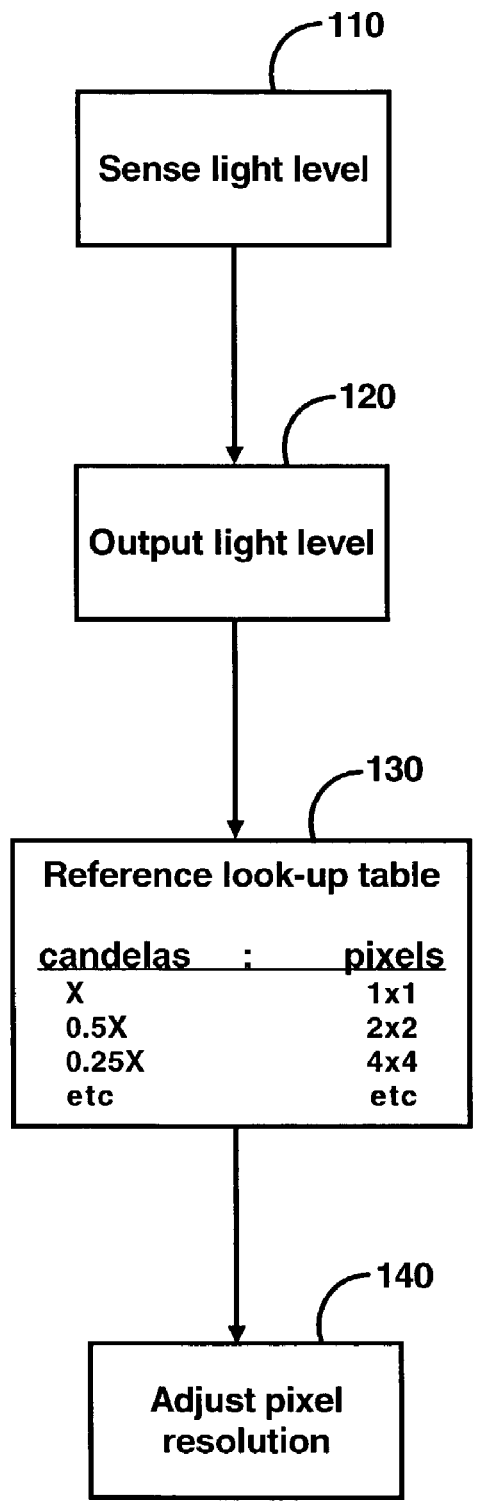
FIG. 1A is a flow chart illustrating an alternative automatic function of the digital camera according to an embodiment of the present invention.

FIG. 1A charts the automatic mode of the present invention. At step 110, the light-level sensor 55 measures the ambient light-level of the environment in which the camera is operated. At step 120, the light-level measurement is output to the microprocessor 32 of FIG. 1, which at step 130 references a look-up table that is stored in the internal memory 36 of FIG. 1. The look up table includes information pertaining to changes in the level of light intensity that can trigger an adjustment in CMOS pixel resolution. In this respect, the resolution of the CMOS sensor may be varied substantially incrementally in response to detected changes in the ambient light level. For example, for a given light level measurement of X candelas, the corresponding pixel resolution could be 1×1. For 0.5X candelas the corresponding pixel resolution could be 2×2, and so forth as shown in step 130. Once the microprocessor references the correct pixel resolution for the measured light-level, a control signal is output to the CMOS sensor to adjust pixel resolution as reflected at step 140. It is contemplated that a fitting formula or the like could be used to instruct the microprocessor and CMOS sensor instead of the look up table.

Figure 2A:
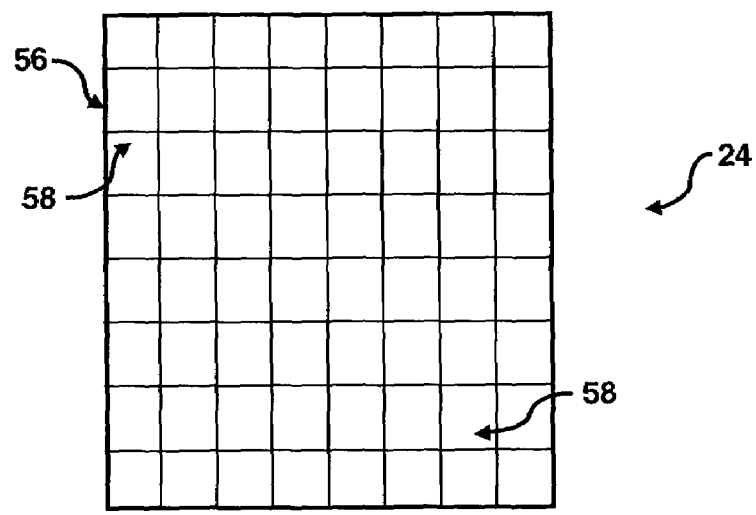
FIG. 2A is a partial view of an image capturing medium having an unsummed array of pixels in the digital camera of FIG. 1.
Figure 2B:
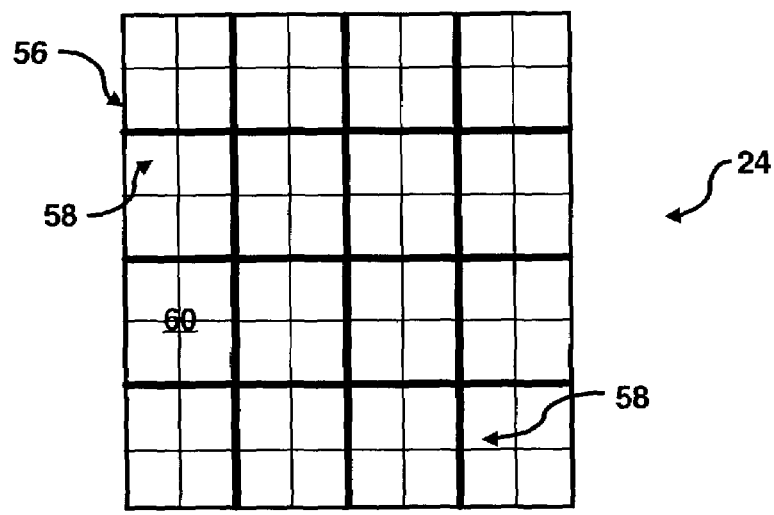
FIG. 2B is a partial view of the image capturing medium of FIG. 2A wherein the array of pixels are summed into 2×2 groups.
Figure 2C:
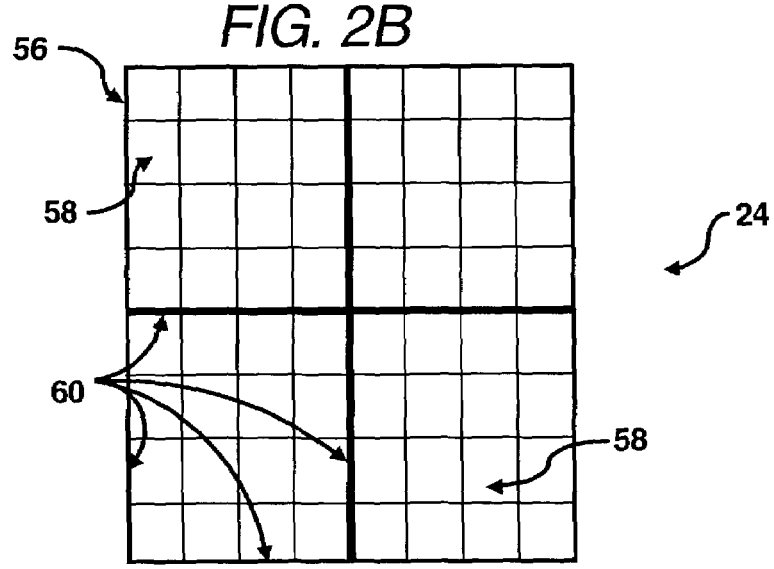
FIG. 2C is a partial view of the image capturing medium of FIG. 2B wherein the array of pixels have been further summed from 2×2 groups into 4×4 groups.

Referring now to FIG. 2A, there is shown a portion of an array of pixels 56 of the CMOS sensor 24, wherein each individual pixel 58 can be dimensionally characterized as 1×1 in horizontal and vertical directions. Electronically, pixel size is virtually adjustable wherein the pixels 58 are combinable together into groups of 2, 3, 4, 8, or any other size group, as depicted in FIGS. 2B and 20. If a view is insufficiently lit, a user can turn the resolution control knob (shown in FIG. 1) to adjust the resolution and light gathering ability of the CMOS sensor 24. In other words, the user can turn the resolution control knob to sum the pixels 58 from 1×1 to 2×2 and vice-versa. The user can then reevaluate whether further increases or decreases in resolution are necessary to yield a desired image quality. Accordingly, FIG. 2B illustrates a portion of the CMOS sensor 24 having pixels 58 summed into groups of 2×2 pixels 60, wherein a 2000× 2000 pixel sensor would effectively reduce to a 1000×1000 pixel sensor for improved light gathering capability. Similarly, FIG. 2C illustrates a portion of the CMOS sensor 24 wherein the pixels 58 have been summed into groups of 4×4 pixels 60, wherein a 2000×2000 pixel sensor would effectively reduce to a 500×500 pixel sensor for even further improved light gathering capability.

The summing process takes place on the CMOS sensor 24 itself and entails combining two or more photoelectronic charges of a given group of pixels. This has the effect of virtually increasing the pixel size of a given sensor. For a 4Mp sensor then, pixel size can be varied from 4,000,000 1×1 actual pixels, to 2,000,000 2×2 virtual pixels, to 1,000, 000 4×4 virtual pixels, etc., on up to one 2000×2000 virtual pixel. The result is groups of net photoelectronic charges that equal the sum of the individual photoelectronic charges of each group of summed pixels. For light gathering purposes, summing provides increased signal-to-noise ratio because the light gathering signal increases but the inherent noise from the CMOS sensor 24 remains constant since the summing function occurs before any gain is applied to the signal. Hence, summing increases the light gathering ability of the CMOS sensor 24 at the acceptable expense of a proportional reduction in resolution with no attendant increase in noise.

This tradeoff between light sensitivity and resolution is a net benefit, especially in low light level situations and with or without relying on the camera's automatic exposure and gain adjustment. Now, a user is able to change the light gathering ability of the camera under low-light level conditions before, during, and after the camera automatically corrects for low light level via exposure and gain control. Moreover, a user can flexibly or dynamically improve the low light performance as desired and independently of any automatic exposure and/or gain adjustments. In other words, a user can decide whether to sacrifice image resolution in favor of improved light gathering ability to arrive at a desired overall image quality, independently of or simultaneously with other image enhancement features such as gain and exposure compensation.

While the present invention has been described in terms of a limited number of embodiments, it is apparent that other forms could be adopted by one skilled in the art. In other words, claim elements are not limited to the imperfections of the exact language used, but encompass as well other structure that fulfills the same functional purpose. In other words, the teachings of the present invention encompass any reasonable substitutions or equivalents of claim limitations except insofar as limited by the prior art. Those skilled in the art will appreciate that other applications, including those outside of the digital camera industry, are possible with this invention. For instance, the present invention is applicable to apparatus associated with videography, photography, infrared photography, ultraviolet photography, stereoscopic photography, microphotography, thermography, and the like. Accordingly, the present invention is not limited to only digital cameras. Accordingly, the scope of the present invention is to be limited only by the following claims.

What is claimed is:

1. A digital camera comprising:
   a lens for directing light into said digital camera;
   a body connected to said lens, said body comprising an exterior and an interior that houses a CMOS sensor having an array of pixels defining an image resolution of said digital camera;
   a microprocessor;
   a resolution selector provided on said exterior that is operable by a user to vary said image resolution between at least three different resolution settings to adjust low light performance of said digital camera, such that the user can selectively and dynamically adjust said image resolution at any time without the need to access a menu system of said camera;
   image enhancement apparatus comprising:
      an aperture disposed between said CMOS sensor and said lens;
      an amplifier interposed between said microprocessor and said CMOS sensor; and
      a shutter; wherein:
      the aperture, the amplifier and the shutter are configured to be automatically adjustable together via the microprocessor in any combination, as well as automatically adjustable via the microprocessor independently of each other; and
   wherein said resolution selector is configured to be operable by the user independently of said image enhancement apparatus.

2. The digital camera as claimed in claim 1, wherein said microprocessor controls said image resolution of said CMOS sensor responsive to actuation of said resolution selector.

3. The digital camera of claim 2 wherein the resolution selector, and the microprocessor, are further configured to enable the user to adjust low light performance of said digital camera before, during, and after the camera automatically corrects for low light level via the image enhancement apparatus.

4. The digital camera of claim 3, and wherein the microprocessor is further configured to adjust the image enhancement apparatus responsive to adjustments made by the user via the resolution selector.

5. The digital camera of claim 1 wherein the resolution selector is configured to adjust low light performance of said digital camera by virtually changing a size of the pixels of the CMOS sensor via the microprocessor, and prior to any application of the amplifier to the image.

6. A method of imaging comprising:
   powering a digital camera such that the camera is prepared to capture an image;
   adjusting, via a user, an image resolution of the camera to one of at least three different resolution settings using a resolution selector provided on an exterior of the camera to lower the image resolution in low-light conditions to improve the camera performance without increasing noise, wherein the adjusting occurs without the need to access a camera menu system; and
   following adjusting the image resolution of the camera using the resolution selector, automatically adjusting the image using an image enhancement apparatus, said image enhancement apparatus comprising an aperture disposed between said CMOS sensor and said lens, an amplifier interposed between said microprocessor and said CMOS sensor, and a shutter.

7. The method of claim 6, wherein adjusting the resolution selector is performed while the user is framing a view.

8. The method of claim 6, wherein the adjusting the resolution selector is performed during camera focusing.

9. The method of claim 6, wherein the resolution selector is positionable in at least three different resolution positions.

10. The method of claim 6, wherein adjusting the image resolution using the resolution selector comprises summing photoelectric charges of a group of pixels of a sensor of the digital camera to reduce the image resolution.

* * * * *

UNITED STATES PATENT AND TRADEMARK OFFICE
CERTIFICATE OF CORRECTION

| | | |
|---|---|---|
| PATENT NO. | : 7,233,354 B2 | Page 1 of 1 |
| APPLICATION NO. | : 10/269047 | |
| DATED | : June 19, 2007 | |
| INVENTOR(S) | : James S. Voss et al. | |

It is certified that error appears in the above-identified patent and that said Letters Patent is hereby corrected as shown below:

On the Title page, in Item (54), in column 1, in "Title", line 2, delete "LOW LIGHT" and insert -- LOW-LIGHT --, therefor.

In column 1, line 2, delete "LOW LIGHT" and insert -- LOW-LIGHT --, therefor.

In column 6, line 33, delete "20" and insert -- 2C --, therefor.

Signed and Sealed this

Twelfth Day of May, 2009

JOHN DOLL
*Acting Director of the United States Patent and Trademark Office*